O. H. JOBSKI.
RIM.
APPLICATION FILED DEC. 12, 1919.
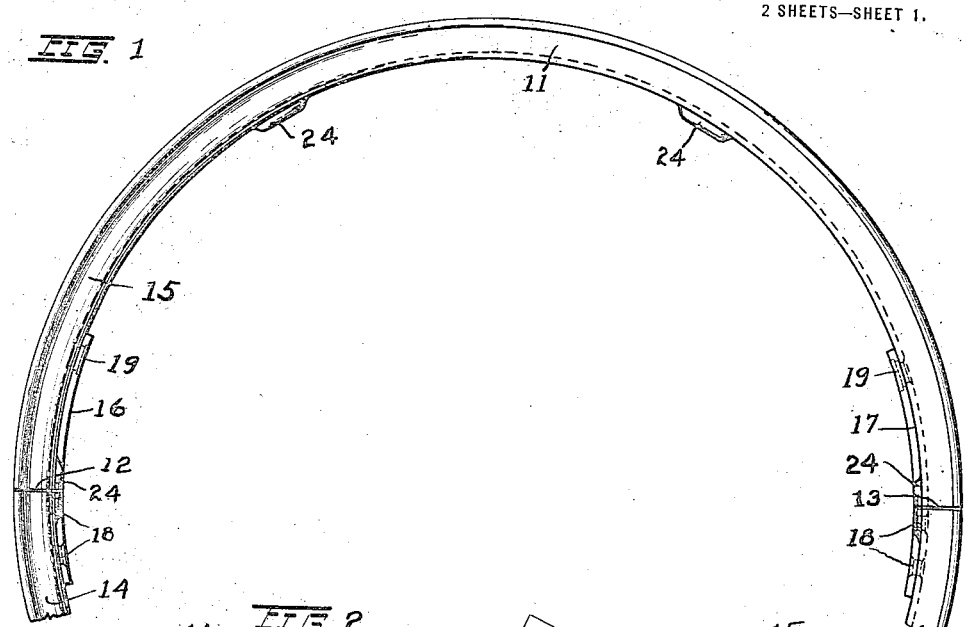
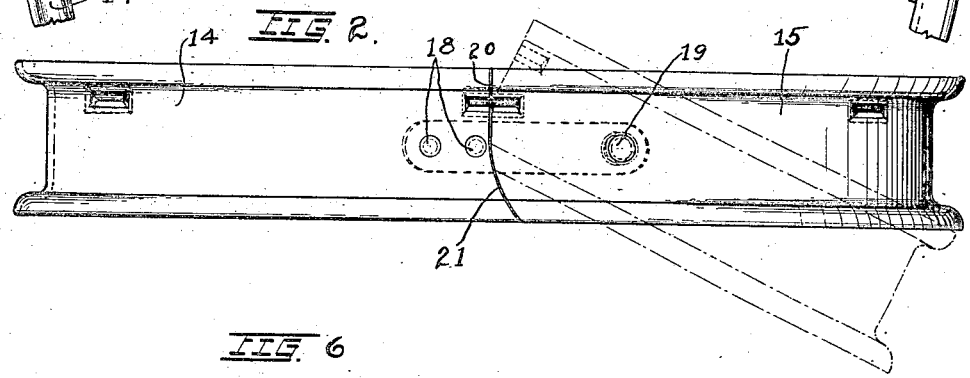
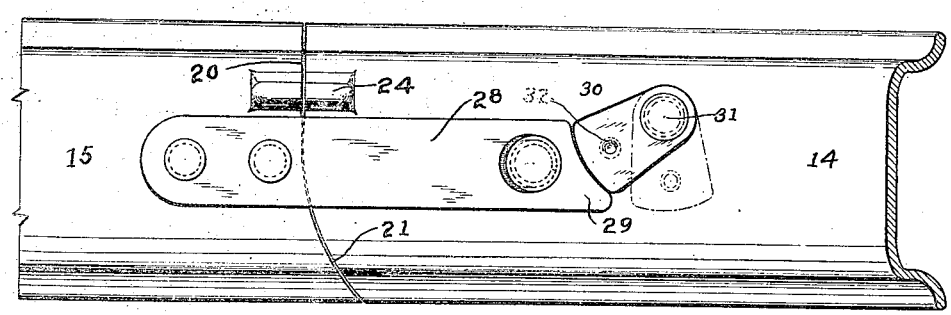
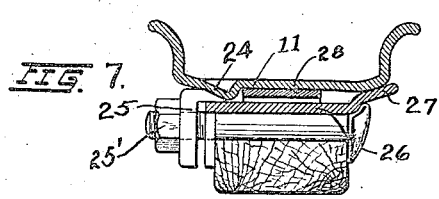
Inventor
OTTO H. JOBSKI.

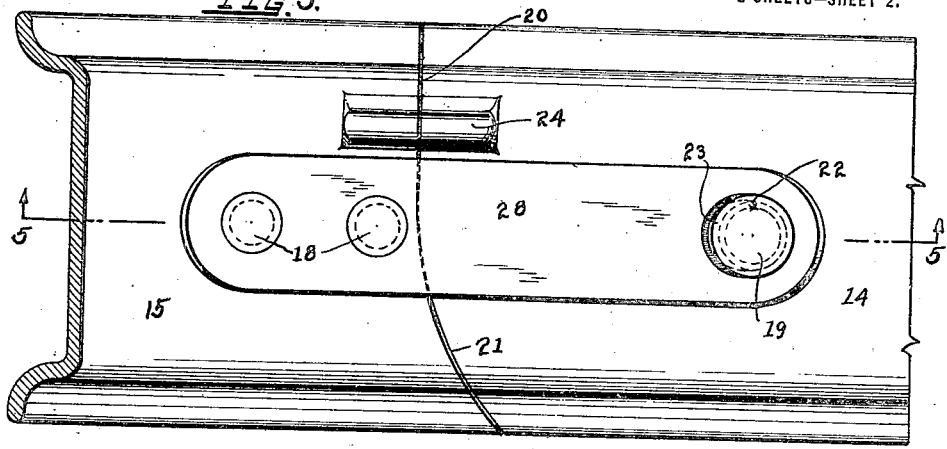
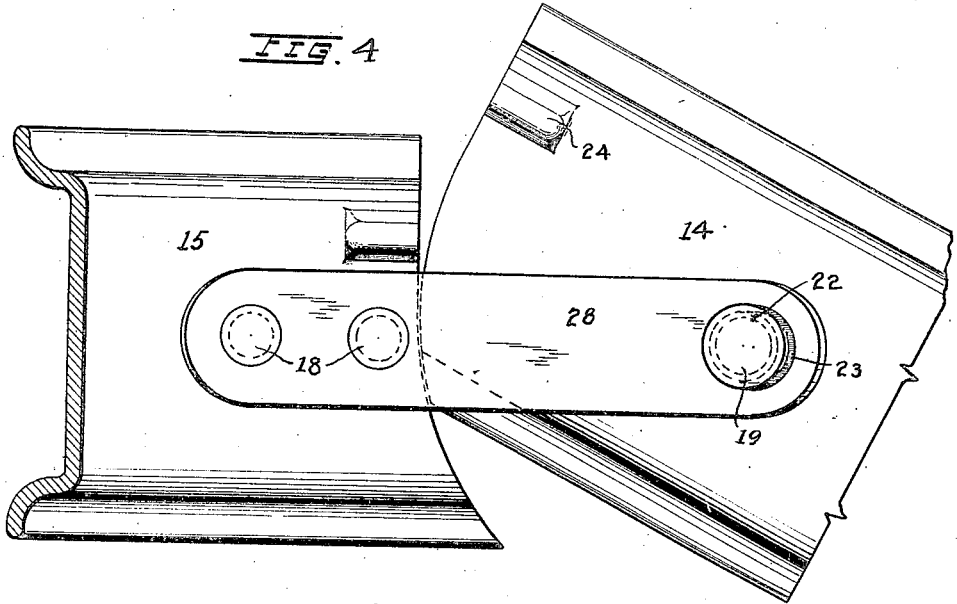
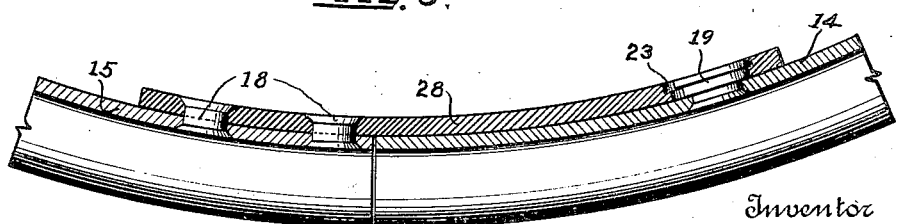

UNITED STATES PATENT OFFICE.

OTTO H. JOBSKI, OF CLEVELAND, OHIO, ASSIGNOR TO THE STANDARD PARTS COMPANY, OF CLEVELAND, OHIO, A CORPORATION OF OHIO.

RIM.

1,422,715.

Specification of Letters Patent.

Patented July 11, 1922.

Application filed December 12, 1919. Serial No. 344,443.

*To all whom it may concern:*

Be it known that I, OTTO H. JOBSKI, a citizen of the United States, and a resident of Cleveland, county of Cuyahoga, State of Ohio, have invented certain new and useful Improvements in Rims, of which the following is a specification.

This invention relates to vehicle wheel rims and more particularly to demountable rims composed of complementary arcuate sections which are hinged together so as to be relatively movable to a position in which they no longer lie in the same plane. One of the objects of the invention is the provision of a rim of such construction which will facilitate the removal or replacing of a tire, and in which the sections are so hinged together as to facilitate use of the rim with fixed rims of standardized type. Other objects of the invention are the provision of a rim of this type which will have no tendency to collapse under the radial pressure of an inflated tire thereon and which is so constructed that its sections will be held in proper alinement by the means which hold the rim on the fixed rim of the wheel. A still further object is the provision of suitable means for locking the sections from relative motion about their pivotal axis.

Other objects of the invention and the features of novelty will be apparent from the following specification, when taken in connection with the accompanying drawings, in which:—

Figure 1 is a fragmentary side elevation of a vehicle wheel rim embodying my invention;

Fig. 2 is a plan view thereof;

Fig. 3 is an enlarged plan view of the inner side of a section of a rim, showing the means for hinging the sections together;

Fig. 4 is a plan view similar to Fig. 3 but showing the parts as swung relatively about their pivotal axis;

Fig. 5 is a fragmentary section on the line 5—5 of Fig. 3;

Fig. 6 is a slightly enlarged plan view similar to Fig. 3 but showing a modified structure; and Fig. 7 is a slightly enlarged transverse section showing a rim embodying my invention as mounted on a felly and fixed rim of usual form.

In the drawings, 11 indicates a vehicle wheel rim which is transplit at substantially diametrically opposite points 12 and 13 to form a pair of complementary arcuate sections 14 and 15. Hinge plates 16 and 17 underlie the ends of the sections, being rigidly secured by rivets 18 to one of the sections and by a pivot 19 to the other section, so that these sections are relatively movable about an axis which extends diametrically of the rim or substantially so, depending on the location of the pivots 19. In order to facilitate the mounting of the rim upon the fixed rim of a wheel, I prefer to place the hinge plates in the center of the rim, the rivets 18 and pivots 19 being on the center-line. The lines on which the rim is split are in part normal to the edge of the rim as indicated at 20 and in part curved as shown at 21 about a center 22, which is close to but not coincident with the center of the pivot 19. Each of the hinge plates is provided with an elongated opening 23, to receive the head of the pivot 19, which permits slight relative circumferential motion of the ends of the sections when they are moved to the position shown in Fig. 4.

It will be evident that the abutting shoulders formed by the straight portions of the splits 20 at one edge will prevent relative swinging motion of the sections in one direction and I prefer to mount the rim upon the fixed rim so that this edge will be the outer side. At circumferentially spaced points, the rim is depressed adjacent this edge to form integral stamped-up beveled lugs 24 which project inwardly from the rim for engagement by the clamps, which hold the rim in seated position on the wheel. As shown in Fig. 7, the rim 11 is adapted to be mounted, in the usual manner, upon a wheel which comprises a felly of the usual type and has a fixed rim 26 thereon which is provided with an inclined flange 27 at its rear edge, the rim being held in place by clamps 25 which have inclined faces for engagement with the beveled lugs 24, and which are held in place by bolts 25' which pass through the felly. When the rim 11 is secured in position on the fixed rim, the engagement of the rim with the inclined flange 27 will insure that the ends of the rim are held in alinement and since two of the beveled lugs 24 are formed partly in one section and partly in the other, the engagement of the clamps 25 at these points will also effectively hold the ends of the sections in proper alinement.

In the modification shown in Fig. 6, a hinge plate 28, similar to the hinge plates 16 and 17 and similarly connected to the ends of the rim sections, is shown as extended at 29 for engagement by a locking latch 30, which is pivoted to the rim by a rivet 31. The locking latch can be swung from the full-line position shown in Fig. 6 to the dotted-line position shown, to permit the rim sections to be swung relatively, and is preferably provided with a slight projection 32 for engagement in a depression or opening in the rim, whereby the latch plate is held in locking position.

When it is desired to remove a tire from the rim, the section 15 is swung about the axis formed by the pivots 19 from the full-line position to the dotted-line position shown in Fig. 2. Since the axis about which the section 15 rotates is slightly eccentric to the curved portions 21 of the splits in the rim and since the pivots 19 can move in the elongated openings 23 in the hinge plates, the ends of the rim sections will be moved slightly together circumferentially under pressure of the tire as the sections are swung relatively about their pivot.

It will be evident that by this construction the beads of the tire will not be stretched, and the pivotal axis about which the parts move can be located in the central plane of the rim, so that the force exerted on the rim by the pressure of an inflated tire thereon will be balanced, and there will be no tendency for the rim to collapse under such pressure. While I have illustrated and described various forms of construction embodying my invention, it will be understood that changes may be made in the details of construction without departing from the spirit of my invention which is defined in the following claims.

I claim—

1. In a device of the class described, the combination of a vehicle wheel rim divided transversely at two points to form substantially equal arcuate sections, the lines of division each comprising a straight portion and a curved portion, and hinge plates connecting the adjacent ends of the rim sections whereby said sections are relatively movable about an axis eccentric to said curved portions, one of said hinge plates having a lost motion connection with one of said sections to permit circumferential motion of said end when the sections are moved about their axis.

2. In a device of the class described, the combination of a vehicle wheel rim divided transversely to form a pair of complementary arcuate sections, each of the lines of division being in part curved, and hinge plates connecting the ends of the sections, each of said plates being rigidly secured at one end to an end of a section and underlying the end of the other section and having a lost motion pivotal connection therewith eccentric to the curved portion of the line of division.

3. In a device of the class described, the combination of a vehicle wheel rim divided transversely to form a pair of complementary arcuate sections, means pivotally connecting said sections so as to permit relative swinging motion thereof out of their common plane, and means carried by one of said sections for locking said sections from pivotal movement.

4. In a device of the class described, the combination of a vehicle wheel rim comprising a pair of complementary arcuate sections, plates pivotally connecting the ends of the sections to permit relative motion thereof about a substantially diametrical axis, and a latch plate pivotally mounted on one of said sections and adapted in one position to engage one of said plates to hold said sections from pivotal movement.

In testimony whereof I affix my signature.

OTTO H. JOBSKI.